US006701442B1

(12) United States Patent
Kunz et al.

(10) Patent No.: US 6,701,442 B1
(45) Date of Patent: Mar. 2, 2004

(54) POWER MANAGEMENT CIRCUIT FOR SELECTIVELY APPLYING POWER TO NETWORK MONITORING CIRCUITRY WHICH MONITORS THE RECEIPT OF NETWORK WAKE-UP MESSAGES

(75) Inventors: Quinn L. Kunz, Roy, UT (US); Nathan A. Mueller, Sandy, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/568,195

(22) Filed: May 9, 2000

(51) Int. Cl.[7] .................................................. G06F 1/32
(52) U.S. Cl. ..................... 713/300; 713/310; 713/320
(58) Field of Search ................................. 713/300, 310, 713/320; 307/52, 65

(56) References Cited

U.S. PATENT DOCUMENTS

| 4,614,880 | A | | 9/1986 | Go et al. |
|---|---|---|---|---|
| 4,677,566 | A | | 6/1987 | Whittaker et al. |
| 4,747,041 | A | | 5/1988 | Engel et al. |
| 5,079,410 | A | * | 1/1992 | Payne et al. ................. 219/506 |
| 5,432,946 | A | | 7/1995 | Allard et al. |
| 5,486,726 | A | | 1/1996 | Kim et al. |
| 5,692,197 | A | | 11/1997 | Narad et al. |
| 5,802,305 | A | | 9/1998 | McKaughan et al. |
| 5,809,313 | A | | 9/1998 | Gianni |
| 5,821,924 | A | * | 10/1998 | Kikinis et al. ............... 345/212 |
| 5,900,026 | A | | 5/1999 | Ryu |
| 5,938,771 | A | | 8/1999 | Williams et al. |
| 5,958,057 | A | | 9/1999 | Gianni |
| 5,978,923 | A | | 11/1999 | Kou |
| 6,061,220 | A | * | 5/2000 | Ohmori et al. ................ 361/84 |
| 6,101,608 | A | * | 8/2000 | Schmidt et al. ............. 713/202 |
| 6,448,672 | B1 | * | 9/2002 | Voegeli et al. ................ 307/52 |

* cited by examiner

*Primary Examiner*—Thomas Lee
*Assistant Examiner*—Paul Yanchus, III
(74) *Attorney, Agent, or Firm*—Workman Nydegger

(57) ABSTRACT

A power management circuit for use in a peripheral module such as a network interface card is presented. The circuit facilitates low power network monitoring for 'Wake On LAN' or 'Plug In and Go' applications as well as for network-initiated configuration and operation of a peripheral or network interface card's host computer. The circuit detects initial application of operational power and initiates assertion of sufficient power for evaluating the earlier programmed configuration parameters. Upon completion of the evaluation of the configuration parameters, the circuit sustains standby power to the portion of the network interface card that is monitoring the network traffic for a wake-up command when the configuration parameters so dictate.

14 Claims, 3 Drawing Sheets

POWER MANAGEMENT CIRCUIT FOR SELECTIVELY APPLYING POWER TO NETWORK MONITORING CIRCUITRY WHICH MONITORS THE RECEIPT OF NETWORK WAKE-UP MESSAGES

BACKGROUND OF THE INVENTION

1. The Field of the Invention

The present invention relates to power management in computer peripheral devices, and more specifically, power management of peripheral devices employing various cognitive levels for purposes of power conservation.

2. The Relevant Technology

Computers from their original inception have undergone significant evolutionary changes both in operation and configuration. For example, computers originally were largely physically bulky in size and inefficient in power consumption, resulting in fixed site devices requiring constant interconnection with generally limitless power sources. As electronics were integrated, the physical dimensions of computers were reduced even to small portable form factors. For a computer to be truly portable, it became necessary for the computer to utilize an independent portable power source such as a battery. Those familiar with battery technologies as they relate to portable computers appreciate the tension between a desirable small form factor and an also desirable limitless power source. As these two ideals met reality, considerable frustration was born.

Significant re-engineering and refinement of computers relating to their appetite for operating power continues as does the ongoing refinement of portable power sources, namely batteries. Many approaches such as powering only essential components have also been undertaken yielding great success toward conserving available portable power.

Other advances in computers relate to a computer's extensibility or its ability to extend its performance or capabilities through the use of interconnections with other devices including other computers. Such interconnections are commonly known as "networks" having various topologies and standards known by those of skill in the art. Since the specifications and standards for these various network topologies evolves and computational capabilities advances, computer developers have created various standard interfaces through which replaceable network interface modules capable of directly interacting with the networks may be utilized. These network interface modules or cards have a standard interface for coupling to the computer and another interface customized to interact with the network standard. In order to facilitate the translation of data from the computer to the network, these network interface modules or cards are also comprised of electronic circuitry that possess their own appetite for operational power.

Those of skill in the art appreciate the various standards for these interface cards that include the PCMCIA, PCI and mini PCI interface card standards. These interface cards or peripherals traditionally physically and electrically interface with a computer via card slots located in the computer. Since these peripheral cards become appendages to the computer, they rely on the computer to provide operational power. Such a dependency further burdens the limited operational power resident or available to the computer.

In further attempts by computer designers to manage the available power, computer designs have resorted to supplying operational power to peripheral modules only when the modules are active and interacting with the network on behalf of the computer. While such an "all-or-nothing" approach proves advantageous to the conversation of portable power resources, the wholesale shutting-down of a network interface card virtually isolates the computer from other network resources and ignores all interaction of the network with the computer. In further attempts to address this dire situation, peripheral card designs have attempted to partition more essential and less-essential network interface circuitry on the peripheral card and apply power to only those portions of the circuitry that directly listen for network commands. However, such approaches have traditionally required the computer to be originally powered and then undergo significant configuration followed by the selective removal of power to the less essential portions of the interface card circuitry.

There is also great interest in the computer networking world to develop an approach that enables a computer user to have their computer operably configured to a network through a remote configuration means that only requires the user to physically connect their computer to the network and to main power. Such an approach would require the computer network interface to continually monitor the network traffic for relevant configuration information.

Therefore, it would be an advancement in the art to develop a power management circuit for use on a interface card or peripheral module that could autonomously determine a low power configuration as assigned and self configured to that setting thereby autonomously assuming a low or reduced power consumption state without significant computer interaction.

SUMMARY OF THE INVENTION

The present invention provides low-power approach to determining when the network monitoring portion of the network circuitry should remain powered and a low-power approach to asserting such power to the circuitry. There is interest in supporting emerging technology relating to simplification and remote control of computers on a network. The present invention provides a solution to supporting functionality such as what is becoming commonly known as "Wake-On-LAN (WOL)" or "Plug In and Go (PIG)" functionality. Such functionality requires power to the network card such as the mini PCI LAN/Modem card upon the assertion of AC power to the computer. In a preferred embodiment, the network card is comprised of a non-volatile memory device containing configuration parameters dictating whether the network card should implement these streamlined configuration functionality. In order to support such functionality, the network card needs to switch power to evaluation circuitry that can read and evaluate the configuration parameters, and when the configuration parameters specify the use of this functionality, then sustain the assertion of power to the network monitoring portion of the network interface circuitry.

The power management circuit of the present invention is comprised of two main sections, the power switch circuit and the power switch control circuit. The power switch, in the preferred embodiment, utilize P-channel MOSFETs that have a very low 'ON' resistance in order to minimize the voltage drop across the switch devices. Two series configured MOSFET switches are place on each input power path to prevent back powering through the intrinsic diodes in the MOSFET. The power switch control circuit controls the power switch circuit for asserting power to the network monitoring portion of the network circuitry under two conditions: (i) upon initial application of power to the computer when the configuration parameters need to be evaluated and (ii) when an evaluation of the network configuration parameters specify that monitoring functionality such as WOL or PIG are requested.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

While the present invention may be described more fully hereinafter with reference to the accompanying drawings, in which the preferred embodiment of the present invention is described, it is contemplated by the inventors that those of skill in the art may modify the invention here described while still achieving the favorable results of this invention. Therefore, the description which follows describing a preferred embodiment should be appreciated for its broader teachings and not as limiting upon the invention.

Referring now to the accompanying drawings, the present invention while described largely for incorporation into a computer and even a personal computer environment, also has broad applications to integration within other digital devices which may assume other form factors different from a more traditional computer environment. Such broader digital device applications are contemplated by the inventor and are deemed to be within the scope of the present invention.

Figure 1:
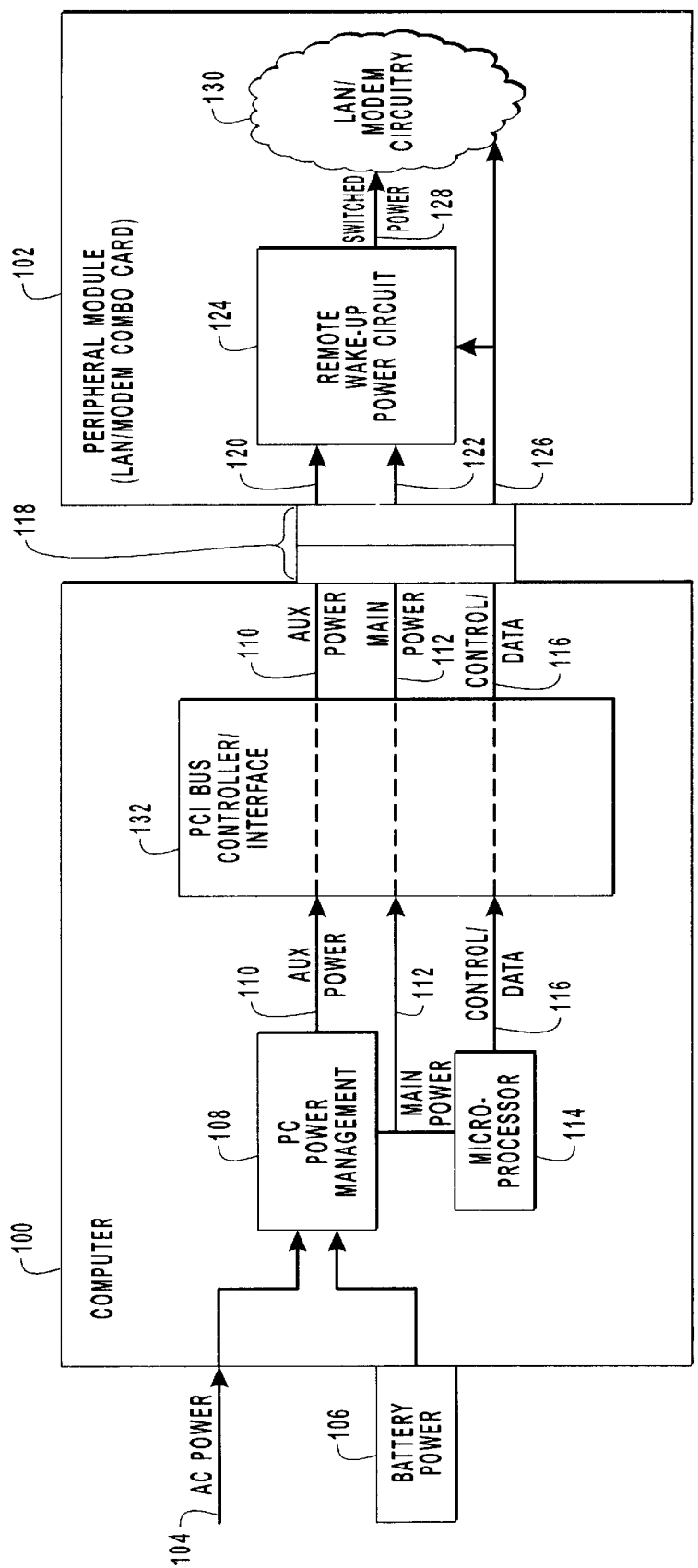
FIG. 1 is a block diagram of a system comprised of a computer and peripheral module within which the power management circuit of the present invention may be practiced, in accordance with a preferred embodiment.

FIG. 1 depicts a computerized environment within which the power management circuit may be practiced. While computer 100 may be comprised of additional functional components not depicted such as memory, hard drives, video displays, etc., such additional components are not herein shown as they would only encumber the drawing and distract from the present invention. Therefore, only the power management components and other components that make possible the power management novelties of the present invention are herein depicted.

In FIG. 1, a computer 100 is generally depicted as interfacing with a peripheral module 102. Those of skill in the art appreciate that a peripheral module may take various form factors including PCMCIA, PCI, mini PCI and other various support module form factors. Such peripheral modules provide extensibility to computer 100 by providing interface functionality between computer 100 and a network or other interconnection topology.

In order to facilitate operation, computer 100 receives electrical power in the form of main power or AC power 104 and alternatively portable or battery power 106. Computer 100 is further comprised of a power management system 108 for partitioning the power resources into a distributed power architecture. In FIG. 1, power management block 108 partitions the available power into an auxiliary input power rail 110 and a main input power rail 112. Auxiliary input power rail 110 provides power more traditionally used for standby and holdup functionality within a computing environment, while main input power rail 112 provides power utilized by computer 100 and peripheral module 102 during full operational functionality. Such power, both auxiliary input power rail 110 and main input power rail 112 are generally made available as generated without additional conditioning or modifications at an interface 118 with which peripheral module 102 interfaces.

Computer 100 is further comprised of the PCI bus controller interface 132. The present invention in its preferred embodiment depicts a PCI interface standard, those of skill in the art appreciate that other standards may also be incorporated which implement a bus interface architecture other than the PCI or mini PCI interface. In the preferred embodiment, a mini PCI interface is depicted which facilitates the passing of both auxiliary input power rail 110 and main input power rail 112 to interface 118.

FIG. 1 further depicts computer 100 as comprising a microprocessor 114 having a control and data interface 116. Those of skill in the art appreciate that a computer 100 will certainly be comprised of a form of microprocessor or other logic execution device including micro-controllers, digital signal processors (DSP), and may even include logic generated sequencing such as state machines, etc. In the present invention, microcontroller 114 is depicted for its ability via control and data bus 116 to pass or write configuration data into peripheral module 102 dictating a configuration or power state as well as other capabilities to peripheral module 102. While the preferred embodiment contemplates microprocessor 114 as being the originator of such configuration data, it is also contemplated within the present invention that such configuration data may have originated or been preconfigured within peripheral module 102 thereby minimizing the need for a control and data bus 116 interface with peripheral module 102 for facilitating or seeding peripheral module 102 with configuration information.

Peripheral module 102 in FIG. 1 is depicted as receiving auxiliary power 120 and main input power 122 from computer 100 via interface 118. Both auxiliary input power 120 and main input power 122 are presented to a power management circuit 124. The preferred embodiment of the present invention employs power management circuit 124 to provide power management to facilitate a power conversation structure within peripheral module 102. Segregated portions of network interface circuitry, located within a network monitoring circuitry 130, monitor network traffic for commands that may dictate or alternative request that peripheral module 102 notify computer 100 via a control or interrupt signal (not shown) of a request by the network for computer 100 to transition to a higher alert stage, such as a full operational state, thereby enabling the network and computer 100 to interact via a control and data path 126.

Those skilled in the art of network technology appreciate the emergence of designs and technology which enable a computer to achieve a very low power state, even an apparent "off" state and to be awakened from that state by a peripheral module comprised of operational circuitry which is also in a largely "off" state and other monitoring portions which are diligently evaluating network traffic to determine the presence of a specifically addressed wakeup command for that specific computer and peripheral module. Such functionality commonly goes by various names or acronyms such as "wake-on-LAN" (WOL) or "plug-in-go" (PIG). The present invention in its preferred embodiments find application to these and other related power efficient approaches.

Figure 2:
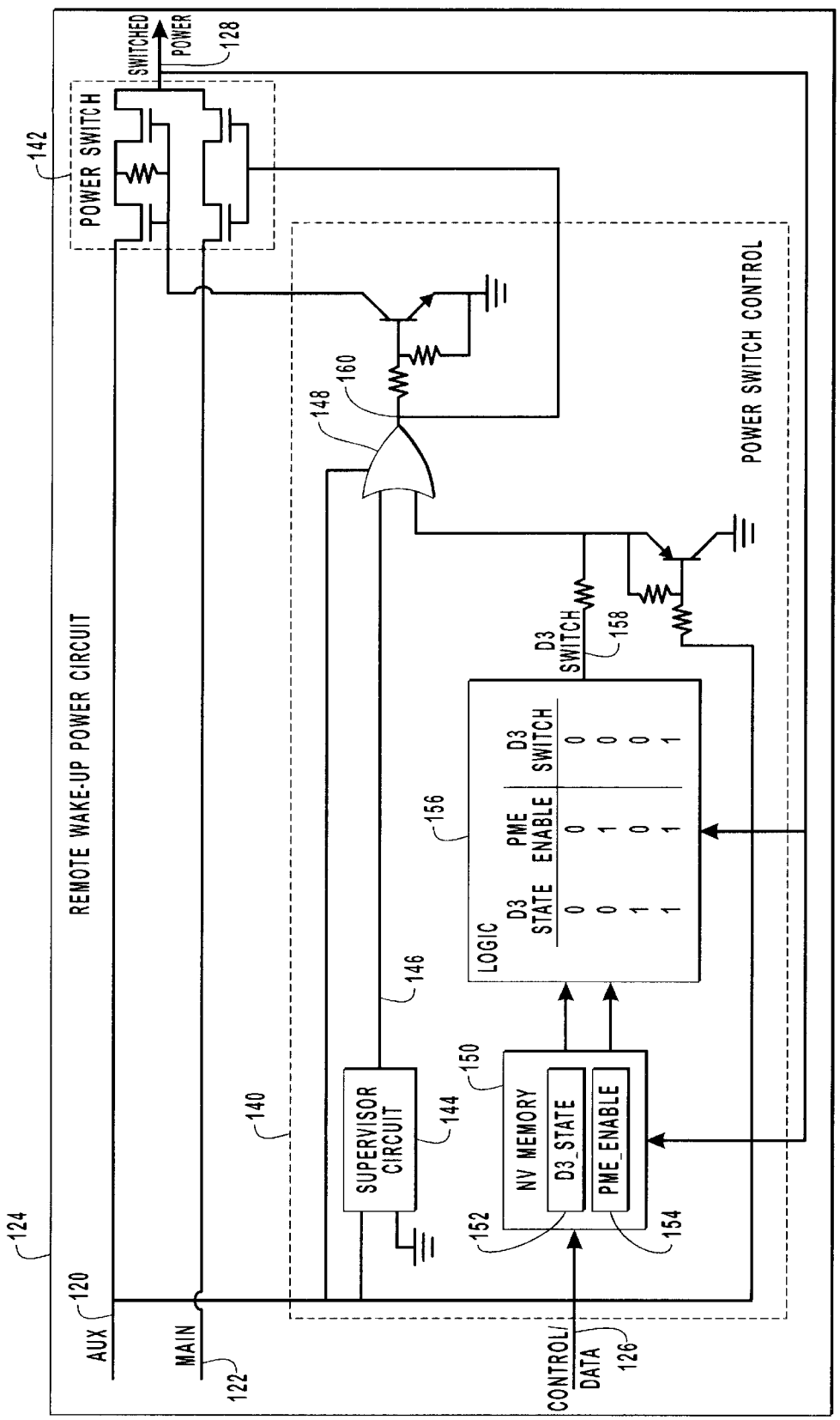
FIG. 2 is a detailed block diagram of the power management circuit, in accordance with a preferred embodiment.

FIG. 2 depicts a more detailed block diagram of power management circuit 124, and its preferred embodiment. Power management circuit 124 performs the primary function of generating a switched power 128 utilized by the wake-up or monitoring portions of the network monitoring circuitry 130 (FIG. 1). As discussed above, network monitoring circuitry 130 for architectures that employ a low power stand-by network monitoring feature, is partitioned into a stand-by or wake on command monitoring portion and a full operational portion. The full operational portion is powered by main input power 122 as depicted in FIG. 1. The other stand-by or wake on demand portion of the circuitry is powered by switched power 128.

In the preferred embodiment of the present invention, power management circuit 124 receives auxiliary input power 120 and main input power 122 and through a determination of specific configurations within the peripheral module, determines when to generate switched power 128 from auxiliary input power 120 and when to generate switched power 128 from main input power 122. Therefore, power management circuit 124 is comprised of two circuit portions, (i) a power switch circuit 142 which selectively routes auxiliary input power 120 and main input power 122 to become switched power 128, and (ii) a power switch control circuit 140 which makes such a determination and asserts the appropriate control signals to power switch circuit 142.

It should be kept in mind that when peripheral module 102 is in full operational mode, main input power 122 will supply switched power 128. Therefore, an important function of power switch control circuit 140 is to determine the circumstances under which power switch control circuit 140 should assert switch power 128 when auxiliary input power 120 is presented thereto. That is to say, power switch control circuit 140 evaluates the peripheral module configuration to determine when the peripheral module has been preconfigured or programmed to participate in network monitoring functionality such as waking or arousing the computer upon the receipt of a network command instructing the peripheral module to do so or when a computer and peripheral module have recently been interfaced with a network and power either in the form of AC power 104 (FIG. 1) or battery power 106 (FIG. 1) has been made available to computer 100. Under at least these two circumstances, power switch control circuit 140 must determine whether to activate this network monitoring portion of network monitoring circuitry 130 (FIG. 1) or remain dormant and inactive until otherwise directed by computer 100.

Power switch control circuit 140 is comprised of (i) a supervisor circuit 144 for asserting a one time configuration evaluation pulse upon the initial connection of computer 100 and peripheral module 102 to power, and (ii) circuitry for determining when an enabling signal should be sustained in order to maintain the continued assertion of switched power 128 to keep the stand-by or network monitoring portions of the network monitoring circuitry active and listening for specific commands from the network.

Supervisor circuit 144 receives auxiliary input power 120 and, upon a rising edge of the receipt of auxiliary input power 120, generates a pulse in the form of output 146 which drives into an "OR" gate 148, which when directed by supervisor circuit 144 asserts an output 160 causing switched power 128 to momentarily apply power to evaluation logic capable of determining the preconfigured state of peripheral module 124.

Power switch control circuit 140 is further comprised of a non-volatile memory 150 and evaluation logic 156. As mentioned earlier, the configuration of peripheral module 102 is either dictated or configured by computer 100 or preconfigured, such as at the factory, by another source, in either approach, non-volatile memory 150 may be comprised of various configuration parameters. FIG. 2 depicts a configuration parameter 152 designating a low power state, figuratively depicted as a low power state D3, in accordance with one well known power management configuration architecture. Under such a power designation, configuration parameter 152 when asserted, designates to peripheral module 102 that it should assume a low operational network circuitry deasserted. Additionally, a configuration parameter 154 depicts a power management event parameter dictating that the peripheral module should assert or apply power to the portion of the network monitoring circuitry that continuously monitors the network for wake up types of commands.

Evaluation logic 156 combines the inputs of configuration parameters 152 and 154 to determine an output 158 which, under the correct input conditions, causes the sustained assertion of switched power 128. It should be pointed out that both evaluation logic 156 and non-volatile memory 150 are further configured to receive operational power from switched power 128. Such power is initially asserted as a result of supervisor circuit 144 upon the initial connection of computer 100 with operational or available input power. While under the effect of switched power 128 as initiated by supervisor circuit 144, evaluation logic 156 upon determining that the wake-up or power management features of the peripheral module have been specified to be invoked, asserts output signal 158 causing switched power 128 to be sustained prior to the expiration of the pulse as asserted by supervisor circuit 144. As a result, the wake-up on command portion of the network monitoring circuitry remains activated via switched power 128.

Figure 3:
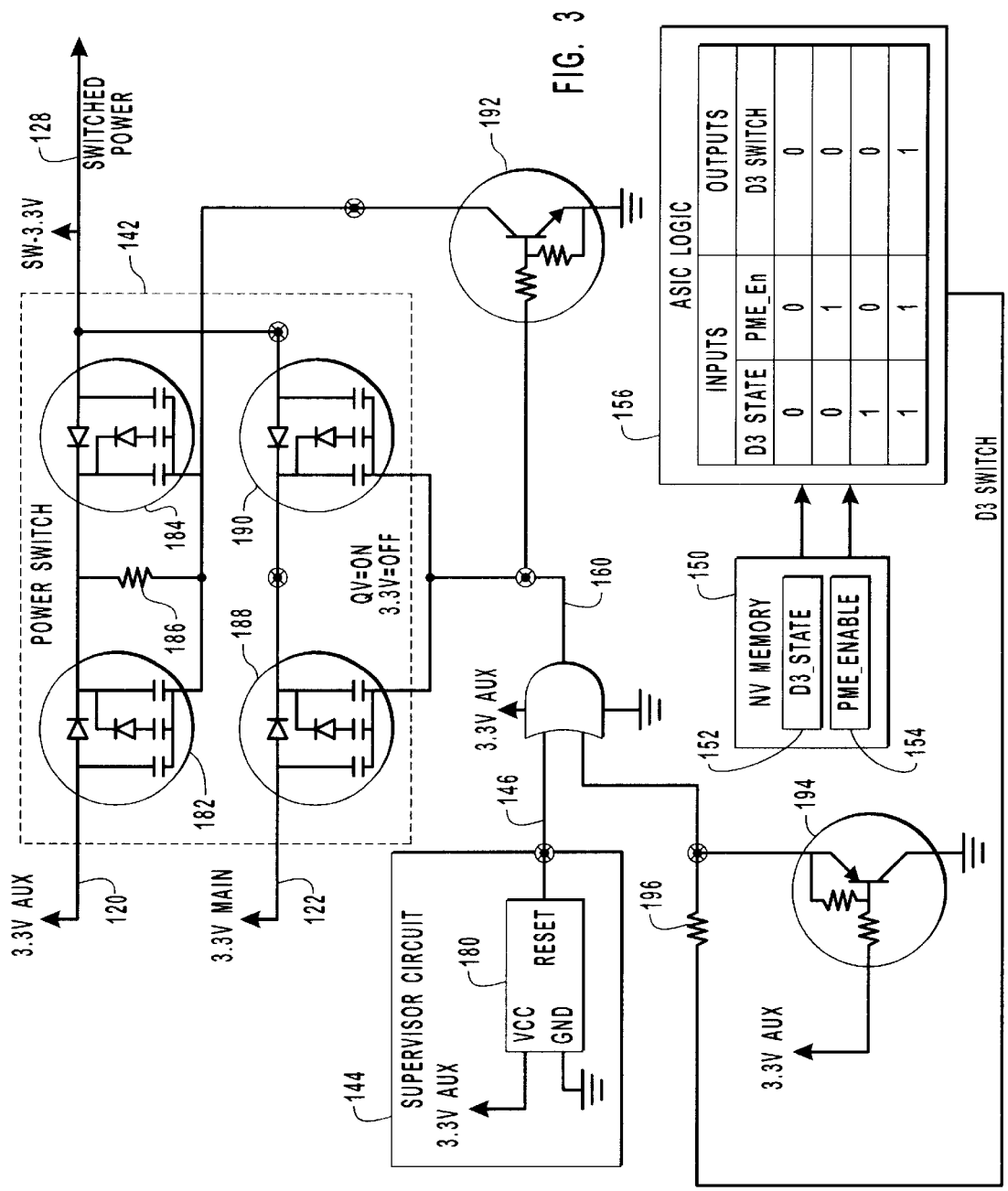
FIG. 3 is a detailed circuit diagram of the power management circuit, in accordance with a preferred embodiment.

FIG. 3 depicts a detailed circuit diagram of power management circuit 124. Specific voltages and components have been designated in FIG. 3 in accordance with a preferred low voltage implementation of the present invention. Power switch circuit 142 is comprised of a series configured pair of semi-conductor switches, 182 and 184, for relaying auxiliary input power 120 to switched power 128. Likewise, switches 188 and 190 facilitate the passing or relaying of main input power 122 to switched power 128. While the present embodiment depicts a series configured plurality of controllable switches, it is contemplated that single switches in the form of relays or otherwise may also be implemented. The present configuration of a plurality of switches results from inherent forward biasing conduction of diodes within the specific selected components. While various switching devices may be employed, one suitable device for implementing the configuration of power switched circuit 142 is a MOSFET, and more particularly P-channel MOSFET such as a S12315DS device which is readily available.

The power switch control circuit 140 (in FIG. 2) is comprised of the remaining elements as depicted in FIG. 3. Supervisor circuit 144 is comprised of a pulse generating circuit or device such as a MAX810 or other suitable device capable of generating a pulse of sufficient duration to enable the configuration parameters to be read and evaluated to make a determination as to whether to sustain assertion of switch power 128 to a stand-by or network monitoring portions of the network monitoring circuitry. The combination of the initial pulse as generated by supervisor circuit 144 is combined with any resulting pulse from an evaluation of the configuration parameters through the use of a logic gate 148 (in FIG. 2) taking the form of an OR gate and generating an output 160. Output 160 directly drives the gates of portions of power switch 142 and indirectly drives the gates of other portions of power switch 142 via biased transistor 192. Biased transistor 192 may be created from discrete components using biasing techniques known by those of skill in the art, or alternatively may be implemented using a pre-biased transistor such as a MUN5214T1 readily available. A biased transistor 194 may be likewise comprised of discrete components or may be implemented using a self-contained bias device such as a MUN5114T1 or like device.

Evaluation logic such as logic 156 may be comprised of discreet components or other forms of available logic circuitry which may be resident on portions of the LAN modem circuitry logic including any available application-specific integrated circuits (ASIC). Those of skill in the art appreciate the various components that may be employed to implement non-volatile memory 150. The miscellaneous other circuit components such as resistor 186 and 196 provide pull-up capability or other series resistance functionality known by those of skill in the art.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a peripheral device for connecting with a computing device, a power management circuit for selectively applying power to network monitoring circuitry on said peripheral device, said circuit comprising:
   a) a power switch control circuit configured so as to selectively determine when to apply power to said network monitoring circuitry, wherein said network monitoring circuitry is configured to monitor the receipt of network messages directing said computing device to wake-up from a low or no power state; and
   b) a power switch circuit configured to receive at least one of an auxiliary input power and a main input power and, when directed by said power switch control circuit, conducting said at least one of said auxiliary input power and said main input power as a selectively switched power to said network monitoring circuitry, said power switch circuit comprising:
      (i) an auxiliary input power switch comprising a first switching element and a second switching element that are connected to selectively output the auxiliary input power to said network monitoring circuitry when an auxiliary input power control is actuated by the power switch control circuit; and
      (ii) a main input power switch comprising a first switching element and a second switching element that are connected to selectively output the main input power to said network monitoring circuitry when a main input power control is actuated by the power switch control circuit.

2. The power management circuit, as recited in claim 1, wherein said power switch control circuit comprises:
   a) a non-volatile memory for storing power configuration and wake-up on network preferences for use in selectively determining when to apply said selectively switched power to said network monitoring circuitry.

3. The power management circuit, as recited in claim 2, wherein said power switch control circuit comprises:
   a) wake-on network notification evaluation logic for evaluating said power configuration preferences to determine when to direct said power switch circuit to conduct said selectively switched power to said network monitoring circuitry.

4. The power management circuit, as recited in claim 3, wherein said power switch control circuit comprises:
   a) a supervisor circuit for monitoring said auxiliary input power and upon detection of said auxiliary input power generating an output of a fixed evaluation duration for indirectly directing said power switch circuit to conduct said auxiliary input power as said selectively switched power to said network monitoring circuitry thereby applying said selectively switched power to said wake-on network notification evaluation logic and said non-volatile memory; and
   b) a means for combining said output of said fixed duration from said supervisor circuit with an output from said wake-on network notification evaluation logic thereby controlling said power switch circuit to conduct said at least one of said auxiliary input power and said main input power to said network monitoring circuitry when said supervisor circuit asserts said output for a fixed evaluation duration and when said wake-on network notification evaluation logic evaluates said power configuration preferences to direct said power switch circuit to conduct said selectively switched power to said network monitoring circuitry.

5. The power management circuit, as recited in claim 1, wherein said switching elements are Field Effect Transistors (FETs).

6. A peripheral module for connecting a portable computer to a network, said peripheral module comprising:
   a) network monitoring circuitry operably coupled to said network so as to be capable of receiving a wake-up command, said network monitoring circuitry further comprising a switched power interface through which said network monitoring circuitry receives operational power; and
   b) a power management circuit for selectively applying said operational power to said network monitoring circuitry as determined through an evaluation of preferences as specified by said portable computer, the power management circuit comprising:
      a power switch control circuit; and
      a power switch circuit configured to receive at least one of an auxiliary power and a main power and, when directed by said power switch control circuit, conducting one of said auxiliary power and said main power as the operational power to said network monitoring circuitry, wherein said power switch circuit comprises:
    an auxiliary power switch comprising a first transistor and a second transistor that are connected in series to selectively output the auxiliary power as operational power to the network monitoring circuitry when an auxiliary power control is actuated by the power switch control circuit; and
    a main power switch comprising a first transistor and a second transistor that are connected in series to selectively output the main power as operational power to the network monitoring circuitry when a main power control is actuated by the power switch control circuit.

7. The peripheral module, as recited in claim 6, wherein said power switch control circuit comprises:
  a) a non-volatile memory for storing power configuration and wake-up on network preferences for use in selectively determining when to apply said auxiliary power and said main input power as the operational down to said network monitoring circuitry.

8. The peripheral module, as recited in claim 7, wherein said power switch control circuit further comprises:
  a) wake-on network notification evaluation logic for evaluating said power configuration preferences to determine when to direct said power switch circuit to conduct said auxiliary power and said main input power as the operational power to said network monitoring circuitry.

9. The peripheral module, as recited in claim 8, wherein said power switch control circuit further comprises:
  a) a supervisor circuit for monitoring said auxiliary input power and upon detection of said auxiliary input power generating an output of a fixed evaluation duration for indirectly directing said power switch circuit to conduct said auxiliary input power as said operational power to said network monitoring circuitry thereby applying said operational power to said wake-on network notification evaluation logic and said non-volatile memory; and
  b) a means for combining said output of said fixed duration from said supervisor circuit with an output from said wake-on network notification evaluation logic thereby controlling said power switch circuit to conduct said at least one of said auxiliary input power and said main input power as operational power to said network monitoring circuitry when said supervisor circuit asserts said output for a fixed evaluation duration and when said wake-on network notification evaluation logic evaluates said power configuration preferences to direct said power switch circuit to conduct said operational power to said network monitoring circuitry.

10. The peripheral module, as recited in claim 6, wherein said transistors are Field Effect Transistors (FETs).

11. A network monitoring circuit comprising:
  a) a power management circuit for evaluating computer wake-up configuration parameters and in response, for selectively applying switched power;
  b) a network monitoring portion powered by said switched power and operably coupled to a network for monitoring and recognizing a wake-up command sent from said network; and
  c) wherein the power management circuit comprises:
    a power switch control circuit for selectively determining when to apply power to said network monitoring portion; and
    a power switch circuit for receiving at least one of an auxiliary input power and a main input power and, when directed by said power switch control circuit, conducting said at least one of said auxiliary input power and said main input power as a selectively switched power to said network monitoring circuitry, said power switch circuit, the power switch circuit including:
      an auxiliary input power switch having an input for receiving said auxiliary input power, an output coupled to said selectively switched power, and an control input electrically coupled to said power switch control circuit for activating said auxiliary input power switch, comprising a first transistor having a first input, a first output, and a control input, said first input electrically coupled to said auxiliary input power and said control input electrically coupled to said power switch control circuit and a second transistor having a first input, a first output, and a control input, said first input electrically coupled to said first output of said first transistor and said control input electrically coupled to said control input of said first transistor, a first output electrically coupled to said selectively switched power; and
      a main input power switch having an input for receiving said main input power, an output coupled to said selectively switched power, and an control input electrically coupled to said power switch control circuit for activating said main input power switch, comprising a first transistor having a first input, a first output, and a control input, said first input electrically coupled to said main input power and said control input electrically coupled to said power switch control circuit and a second transistor having a first input, a first output, and a control input, said first input electrically coupled to said first output of said first transistor and said control input electrically coupled to said control input of said first transistor, a first output electrically coupled to said selectively switched power.

12. The network monitoring circuit, as recited in claim 11, wherein said power switch control circuit comprises:
  a) a non-volatile memory for storing power configuration and wake-up on network preferences for use in selectively determining when to apply said selectively switched power to said network monitoring portion.

13. The network monitoring circuit, as recited in claim 12, wherein said power switch control circuit comprises:
  a) wake-on network notification evaluation logic for evaluating said power configuration preferences to determine when to direct said power switch circuit to conduct said selectively switched power to said network monitoring portion.

14. The network monitoring circuit, as recited in claim 13, wherein said power switch control circuit comprises:
  a) a supervisor circuit for monitoring said auxiliary input power and upon detection of said auxiliary input power generating an output of a fixed evaluation duration for indirectly directing said power switch circuit to conduct said auxiliary input power as said selectively switched power to said network monitoring portion thereby applying said selectively switched power to said wake-on network notification evaluation logic and said non-volatile memory; and
  b) a means for combining said output of said fixed duration from said supervisor circuit with an output from said wake-on network notification evaluation logic thereby controlling said power switch circuit to conduct said at least one of said auxiliary input power and said main input power to said network monitoring portion when said supervisor circuit asserts said output for a fixed evaluation duration and when said wake-on network notification evaluation logic evaluates said power configuration preferences to direct said power switch circuit to conduct said selectively switched power to said network monitoring portion.

* * * * *

UNITED STATES PATENT AND TRADEMARK OFFICE
CERTIFICATE OF CORRECTION

PATENT NO. : 6,701,442 B1
DATED : March 2, 2004
INVENTOR(S) : Quinn L. Kunz and Nathan A. Mueller It is certified that error appears in the above-identified patent and that said Letters Patent is hereby corrected as shown below:

Column 9,
Line 21, change "down" to -- power --
Line 55, change "arc" to -- are --

Signed and Sealed this

Twenty-eighth Day of December, 2004

JON W. DUDAS
*Director of the United States Patent and Trademark Office*